United States Patent [19]
Gorman

[11] 3,817,961
[45] June 18, 1974

[54] POLYMERIZATION OF 9-VINYL CARBAZOLE

[75] Inventor: Susan B. Gorman, Barrington, Ill.
[73] Assignee: Desota, Inc., Des Plaines, Ill.
[22] Filed: Aug. 31, 1972
[21] Appl. No.: 285,374

[52] U.S. Cl.... 260/88.3 R, 260/33.6 R, 260/33.6 U
[51] Int. Cl............................................... C08g 5/00
[58] Field of Search...... 260/88.3 R, 33.6 R, 33.6 U

[56] References Cited
UNITED STATES PATENTS

| | | | |
|---|---|---|---|
| 2,877,216 | 3/1959 | Fikentscher et al. | 260/88.3 R |
| 3,037,861 | 6/1962 | Haegl et al. | 260/88.3 R X |
| 3,485,624 | 12/1969 | Thiebaut et al. | 260/88.3 R X |
| 3,627,524 | 12/1971 | Kinjo et al. | 260/88.3 R X |

Primary Examiner—Morris Liebman
Assistant Examiner—S. M. Person
Attorney, Agent, or Firm—Dressler, Goldsmith, Clement & Gordon Ltd.

[57] ABSTRACT

9-vinyl carbazole is polymerized by rapidly heating the same in the form of a powdered layer containing at least about 0.25 percent by weight of azobis nitrile catalyst or initiator to cause rapid and complete polymerization in bulk in the presence of air at atmospheric pressure. The polymer product is soluble in benzene and toluene.

6 Claims, No Drawings

POLYMERIZATION OF 9-VINYL CARBAZOLE

The present invention relates to the continuous polymerization of 9-vinyl carbazole in the presence of atmospheric oxygen at atmospheric pressure.

The bulk polymerization of 9-vinyl carbazole is known, a very small proportion of free radical polymerization catalyst or initiator being stirred into molten 9-vinyl carbazole and the container holding the mixture of molten 9-vinyl carbazole and catalyst or initiator being transferred quickly to an autoclave where it is heated to a temperature of 100–150°C. in an inert atmosphere under elevated pressure of the order of 40 atmospheres. As will be evident, such a reaction procedure is arduous and expensive. Moreover, the polymer product is relatively insoluble in benzene and toluene.

In accordance with the present invention, it has been found that if an azobis nitrile catalyst or initiator is used in larger proportions than was heretofore practicable, and if this catalyst or initiator is employed in admixture with 9-vinyl carbazole in the form of a powdered layer, with the powdered layer being rapidly heated, preferably using radiant heat for this purpose, then very rapid polymerization is effected without agitation of the 9-vinyl carbazole-catalyst mixture, despite the presence of atmospheric oxygen, and with the reaction being conducted at atmospheric pressure despite the tendency of the azobis nitrile to decompose at elevated temperature.

In the prior art technique of stirring the catalyst or initiator into the molten 9-vinyl carbazole, it is not feasible to employ a large proportion of catalyst. This is because, even when the proportion of catalyst approaches 0.2 percent by weight, based on the weight of the 9-vinyl carbazole, which is the maximum proportion contemplated in the prior art, the reaction is so rapid that it is very difficult to obtain any uniform mixture of monomer and catalyst before the reaction has formed a solid polymer which is difficult to remove from the reaction vessel.

It is desired to point out that when the distribution of catalyst is inadequate, then polymerization is not complete, and the unreacted monomer present in the final product must be removed since it interferes with the intended utilization. More particularly, when doped with sensitizing materials, the unreacted monomer tends to precipitate, forming crystalline deposits in the coatings which are produced and interfering with the desired photoconductive quality of the coatings.

On the other hand, and when smaller proportions of catalyst are used, such that it becomes feasible to incorporate the catalyst in the molten monomer, then the reaction is air inhibited and is preferably conducted at high pressure.

The minimum proportion of catalyst which has been found to be useful in this invention is about 0.25 percent. Even at this proportion, the product is somewhat air inhibited. Below this proportion, the reaction becomes so sluggish and air-inhibited that it is no longer fast enough to enable practical and continuous processing. Incomplete conversion is also encountered. Without complete conversion, the product includes unreacted monomer which must be extracted. As previously indicated, unless the unreacted product is extracted, the monomer precipitates in the doped coating and this is detrimental to the appearance and charging of the product.

Still further, the polymer molecular weight which is obtained using the smaller proportions of catalyst necessary in the prior art is very high, and the solubility is very poor. I have tested polyvinyl carbazoles produced by others, but none of these possess any significant solubility in aromatic hydrocarbon solvents such as benzene or toluene so that effective coating solutions in these solvents could not be obtained.

In the preferred practice of this invention, the proportion of catalyst is at least 0.3 percent by weight, based on the weight of the 9-vinyl carbazole, because, at this level, the reaction is quite rapid and is no longer air inhibited. However, the resulting product is hard and glass-like and is only slightly foamed so that it is more difficult to break-up than when still higher proportions of catalyst are used.

When the catalyst proportion is at least about 0.45 percent, the reaction becomes so vigorous that a foam is obtained, and the rapid and complete conversion to polymer which is achieved produces a cellular, solid product which is very easy to crush and dissolve.

From the standpoint of the maximum proportion of catalyst, one can broadly employ up to 5 percent by weight, based on the weight of the 9-vinyl carbazole, but it is preferred to minimize the proportion of catalyst consistent with the achievement of an easily crushed, foam product. Thus, the use of proportions of catalyst in excess of 1 percent by weight, while feasible, is wasteful of expensive catalyst.

It is desired to point out that the resin products of this invention, regardless of whether they are produced in the form of a foam or not, are far more soluble than the corresponding products of the prior art. Thus, while commercially available polyvinyl carbazole is utilized in the production of photoconductive coatings in the form of a solution of chlorobenzene, the polyvinyl carbazole products of this invention are adequately soluble in benzene and toluene so that solutions containing at least about 10 percent of resin solids can be formulated. As will be understood, a 10 percent solution enables the deposition of useful films, but this utilization preferably involves still higher resin solids concentration, and the polyvinyl carbazole resins produced herein enable 20 percent solutions in benzene or toluene to be provided, and these are quite useful.

While azobis nitriles generally are useful in this invention, such as azobiscyclohexylnitrile and azobisdimethyl valeronitrile, azobisisobutyronitrile is particularly preferred.

Referring to the starting powder, the degree of subdivision is not critical, but if the particle size of the monomer is too large, discoloration occurs. 10 mesh or below is quite suitable. The monomer powder is preferably used in the form of a fluffy crystalline material.

The mixture of the 9-vinyl carbazole and azobis nitrile is obtained by simply blending the respective powders together and the mixture is spread on a support, preferably constituted by a stainless steel conveyor belt. The powdered mixture is simply spread on the support to form a layer which is preferably not thicker than about 1 inch, and is more preferably one-half inch in thickness, or thinner. The powdered layer is then rapidly heated, preferably by radiation using powerful infrared heaters so that the heating, melting, and polymerization are completed in less than 1 minute, preferably in less than 30 seconds.

A considerable proportion of fumes is released, and these are desirably captured in an exhaust hood. The supporting steel conveyor belt is then cooled to produce a solid polymer which is broken up and pulverized.

The polyvinyl csrbazole product is soluble in organic solvents, such as toluene, and can be doped with conventional dopants, such as trinitrofluorenone, in a 1:1 molar ratio to provide coatings which are substantially identical in their photoconductive capacity to commercially available polyvinyl carbazoles, demonstrating that the presence of atmospheric oxygen and the absence of superatmospheric pressure have not disturbed the quality of the polymer product.

The invention is illustrated in the following example.

Example 29 pounds of 9-vinyl carbazole were blended with 0.145 lb. of azobisisobutyronitrile, and the mixture spread to a depth of about three-eighths inch onto a stainless steel conveyor belt moving at about 6.8 ft./min. The material was conveyed under a bank of three 6000 watt IR heaters (20.4 seconds of heat) where it melted and polymerized; then under an exhaust hood, and finally over a cold water bath. The resulting polymer was broken and pulverized to a usable bead form. A 20 percent solution in toluene had a Gardner viscosity of Y.

The polymer made by this process was doped with trinitrofluorenone at a 1:1 molar ratio, coated on aluminum and charged to 500 volts. When exposed to tungsten light, the coating discharged to residual voltage in 7–9 foot candle seconds which is considered to be excellent performance.

The invention is defined in the claims which follow.

I claim:

1. A method of polymerizing 9-vinyl carbazole comprising forming a powdered layer of 9-vinyl carbazole powder in admixture with at least about 0.25 percent by weight of azobis nitrile catalyst and having a thickness not thicker than about 1 inch, and then rapidly heating said powdered layer to cause rapid and complete polymerization in bulk in less than one minute.

2. A method as recited in claim 1 in which said powdered mixture is heated at atmospheric pressure.

3. A method as recited in claim 1 in which radiant heat is employed to heat said powdered layer.

4. A method as recited in claim 2 in which the proportion of said azobis nitrile catalyst is at least about 0.45 percent by weight.

5. A method as recited in claim 1 in which said azobis nitrile catalyst is azobisisobutyronitrile.

6. A method as recited in claim 2 in which the reaction is conducted in the presence of atmospheric oxygen.

* * * * *